United States Patent [19]
Affa

[11] 3,821,970
[45] July 2, 1974

[54] QUICK DISCONNECT CAP FOR CONDUITS
[75] Inventor: Stephen N. Affa, Torrance, Calif.
[73] Assignee: General Connectors Corporation, Burbank, Calif.
[22] Filed: July 24, 1972
[21] Appl. No.: 274,434

[52] U.S. Cl. .................................. 138/89, 220/40 R
[51] Int. Cl. ............................................. F16l 55/10
[58] Field of Search ........ 138/89; 220/24 C, 24 GT, 220/40 R, 40 S

[56] References Cited
UNITED STATES PATENTS

| | | | |
|---|---|---|---|
| 2,609,117 | 9/1952 | Miller | 220/40 R |
| 2,684,779 | 7/1954 | Rafferty | 220/40 R |
| 3,420,585 | 1/1969 | Jensen | 220/40 R X |
| 3,677,301 | 7/1972 | Williams | 220/40 R X |

Primary Examiner—Charles A. Ruehl
Attorney, Agent, or Firm—Lyon & Lyon

[57] ABSTRACT

A quick disconnect cap for conduits which includes a tubular fitting for permanent attachment to an end of a conduit, the fitting having a diametrically extending attachment pin, its ends protruding from the fitting and sealed with respect thereto; and a closure overlying and confronting the end of the fitting, the closure having a sleeve slidable over the fitting and provided with L-slots for receiving and interlocking with the ends of the pin. A seal ring is interposed between the fitting and closure outwardly of the pin and slot connection. The closure supports a headed shaft which extends into the fitting and slidably receives a flange which bears against the end of the fitting and is backed by a spring which exerts an outward force on the closure sleeve to maintain the pin and slot connection in its interlocked condition.

2 Claims, 3 Drawing Figures

PATENTED JUL 2 1974  3,821,970

QUICK DISCONNECT CAP FOR CONDUITS

BACKGROUND OF THE INVENTION

Fuel tanks, radiators and the like are frequently provided with filler caps which include means for quick disconnection and replacement. Usually such caps have sealing means located inwardly from the securing or fastening means; that is, the mechanical fastening means usually surrounds the entrance end of the conduit leading to the tank or radiator.

In order to separate engines from the vehicles in which they are mounted, it is necessary to separate the various supply and discharge lines and at the points of separation it is desirable that either or both separated lines be capped; however, such capping must be accomplished in such a manner as not to interfere with the connections which are made when the engine is mounted in place and, in some instances, such capping must withstand pressure. The conventional filler caps fail to accomplish this purpose because their fastening means interferes with the conventional couplings normally used to join the supply or discharge lines.

SUMMARY OF THE INVENTION

The present invention is a quick disconnect cap for covering either severed end of a conduit which is otherwise open when an engine unit is removed from its mountings, and is summarized in the following objects:

First, to provide a quick disconnect cap which may be substituted for a conventional coupling to cover either or both portions of a conduit and which requires minimal means affixed to the conduit so arranged as not to interfere with attachment of the conduit portions by the coupling.

Second, to provide a quick disconnect cap wherein a pin and bayonet slot joint disposed inwardly from the end of the conduit effects a mechanical connection held in place by the force of a spring interposed between the end of the conduit and the cap.

Third, to provide a quick disconnect cap, as indicated in the preceding object, wherein a seal means is interposed between the pin and bayonet slot joint and the end of the conduit so as to permit pressurizing of the conduit if desired.

Figure 1:
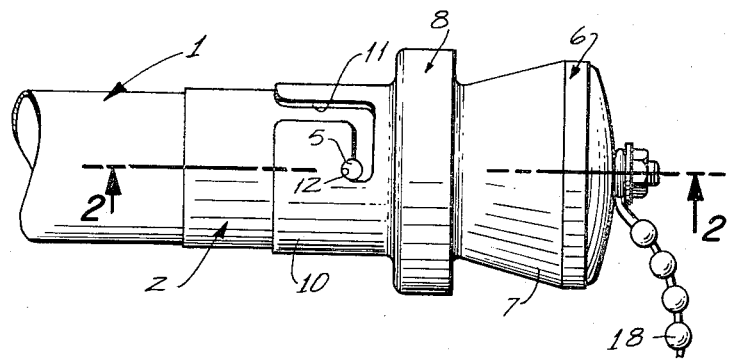
FIG. 1 is a side view of the quick disconnect cap shown mounted on the end of a conduit.

The quick disconnect cap is intended primarily but not limited to the closure of conduit 1 which has been temporarily disconnected from a mating conduit. More specifically, the conduit 1 may be a part of an engine unit serving to supply fluids to the engine or remove fluids therefrom. When the engine is in place, the conduit is joined to its mating conduit by a conventional coupling, not shown. The quick disconnect cap may be employed on either or both the severed ends of the conduit.

Permanently secured and sealed to the conduit is a tubular end fitting 2 which includes a cylindrical sealing surface 3 and a tapered extremity 4. Inwardly from the sealing surface 3 the end fitting is provided with a cross pin 5 which protrudes therefrom at diametrically opposite sides and is sealed relative thereto.

The quick disconnect cap includes an essentially bulbular end closure 6 having a tapered grip portion 7 which joins to a hollow flange structure 8 forming an internal seal ring channel 9. Continuing from the flange 8 is a sleeve 10 which fits slidably over that portion of the end fitting inwardly from its sealing surface 3 and is provided with L-shaped or bayonet slots 11 which cooperate with the ends of the cross pin 5. The inner extremities of the slots 11 terminate in recesses 12 which, when the end closure is urged axially outward as will be described later, tend to lock the end closure in place.

The outer extremity of the end closure receives a central pin 13 which extends into the end of the fitting 2 and terminates in a head 14. The outer end of the pin is provided with a reduced screwthreaded stem 15 which receives a nut 16. A collar 17 is interposed between the nut 16 and the end closure 6. The collar is attached to a chain 18 so that the quick disconnect cap may be permanently retained in the vicinity of the conduit. A sealed connection is formed between the end closure and the base of the stem 15 either by brazing the stem in place or by use of a suitable gasket.

Figure 2:
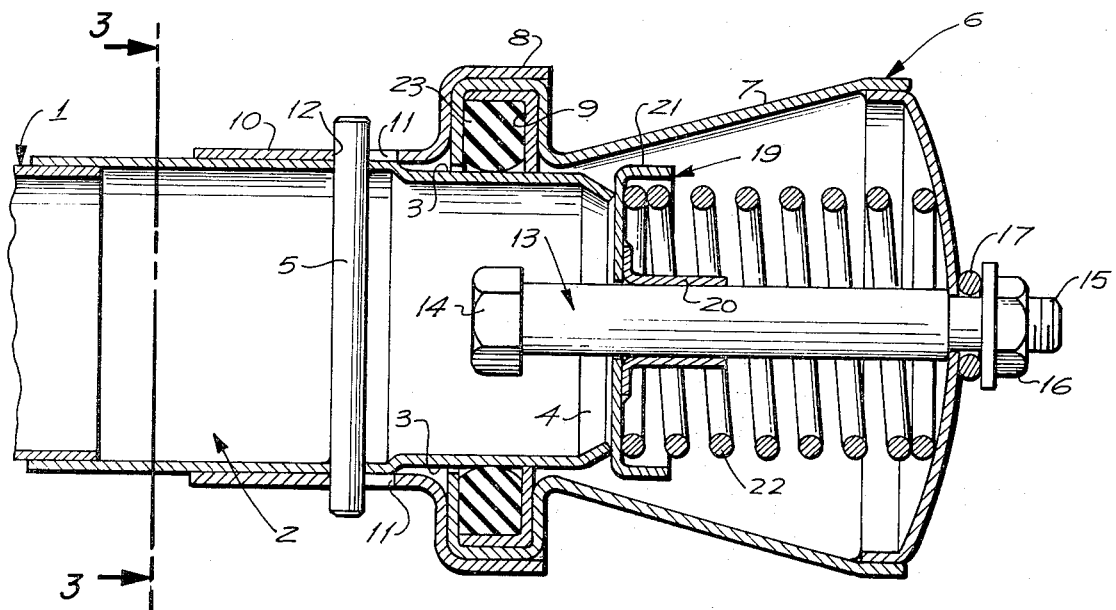
FIG. 2 is an enlarged longitudinal sectional view taken through 2—2 of FIG. 1 with the conduit indicated fragmentarily.
Figure 3:
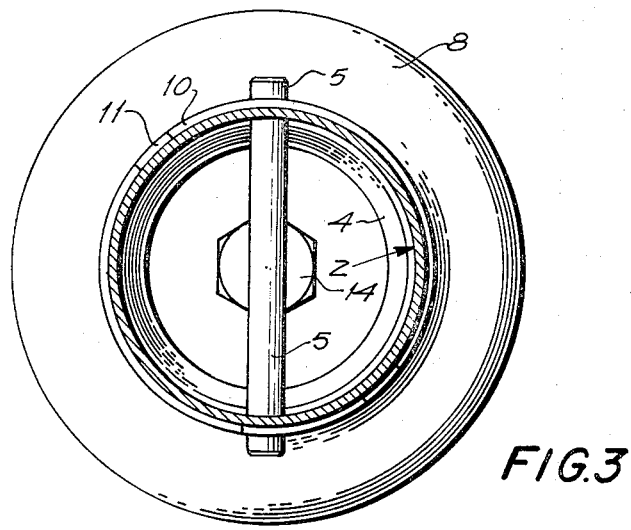
FIG. 3 is an enlarged transverse sectional view taken through 3—3 of FIG. 2.

Slidably mounted on the pin 13 is a flange 19 having a central sleeve 20 and a peripheral rim 21. The flange 19 is larger than the extremity 4 of the end fitting so as to bear thereagainst as shown in FIG. 2. A spring 22 is interposed between the flange 19 and the end closure 6 so that the end closure is forced axially outward causing the ends of the cross pin 5 to engage the recesses 12.

A seal ring 23 is received in the channel 9 and bears against the sealing surface 3 of the end fitting 2. The flange 19 does not in itself form a seal with respect to the end fitting so that the interior of the end closure 6 is maintained at the pressure, if any, existing in the conduit 1.

To install the quick disconnect cap, it is merely necessary to press it axially inward on the end fitting with the entrance end of the bayonet slots in line with the ends of the cross pin, then press the cap further onto the end fitting until the ends of the cross pin are received in the arcuate portions of the bayonet slots, then turning the cap until the ends of the cross pin are received in the recesses 12. To remove the end cap, these steps are reversed.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. The combination with a tubular member having diametrically opposed anchor pins inwardly from its extremity of a quick disconnect closure, comprising:
    a. a cap member formed of sheet material having an enlarged closed end and converging walls extending therefrom to form a readily graspable handle; the converging walls terminating in a first channel flange element;
    b. a sleeve member formed of sheet material slidably fitting the tubular member and having diametrically disposed slots including axial portions and circumferential portions for engagement with the anchor pins, the sleeve member also having a second channel flange element at its outer end complimentary to the first channel flange element to define a radially inwardly directed channel;

c. a seal ring received in the channel engageable with the tubular member;

d. a central stem secured in the cap member;

e. a disk slidably received on the stem and dimensioned to engage the end of the tubular member;

f. and a spring interposed between the disk and the cap member to exert an outward force on the sleeve member thereby to maintain engagement between the anchor pins and circumferential portions of the slots subject to manual engagement with the cap member.

2. A quick disconnect closure for the end of a tube, comprising:

a. an inner sleeve member of sheet material dimensioned to be received on the end of the tube and having a cross pin protruding from diametrically opposite sides of the inner sleeve member and sealed relative thereto, the inner sleeve member also having a sealing zone axially outwardly from the cross pin;

b. a cap member formed of sheet material having an enlarged closed end and converging walls extending therefrom and terminating in a first channel flange element;

c. an outer sleeve member formed of sheet material alidably fitting the inner sleeve member and having diametrically disposed slots including axial portions and circumferential portions for engagement with the protruding ends of the cross pin, the outer sleeve member also having a second channel flange element at its outer end complementary to the first channel flange element to define a radially inwardly directed channel confronting the sealing zone:

d. a seal ring in the channel for sealing engagement with the sealing zone;

e. a central stem secured to the cap member;

f. a disk slidably received on the stem and dimensioned to engage the end of the inner sleeve member;

g. and a spring interposed between the disk and the cap member to exert an outward force on the outer sleeve member thereby to maintain yieldable engagement between the protruding end of the cross pin and the circumferential portions of the slots.

* * * * *